Aug. 24, 1965  S. F. JUDD  3,202,369
ROTARY SHEET METAL TEARING DEVICES
Filed Jan. 16, 1963  3 Sheets-Sheet 1

INVENTOR.
Sebastian F. Judd
BY
Morsell & Morsell
Attorneys

Aug. 24, 1965     S. F. JUDD     3,202,369
ROTARY SHEET METAL TEARING DEVICES
Filed Jan. 16, 1963     3 Sheets-Sheet 2
FIG.2
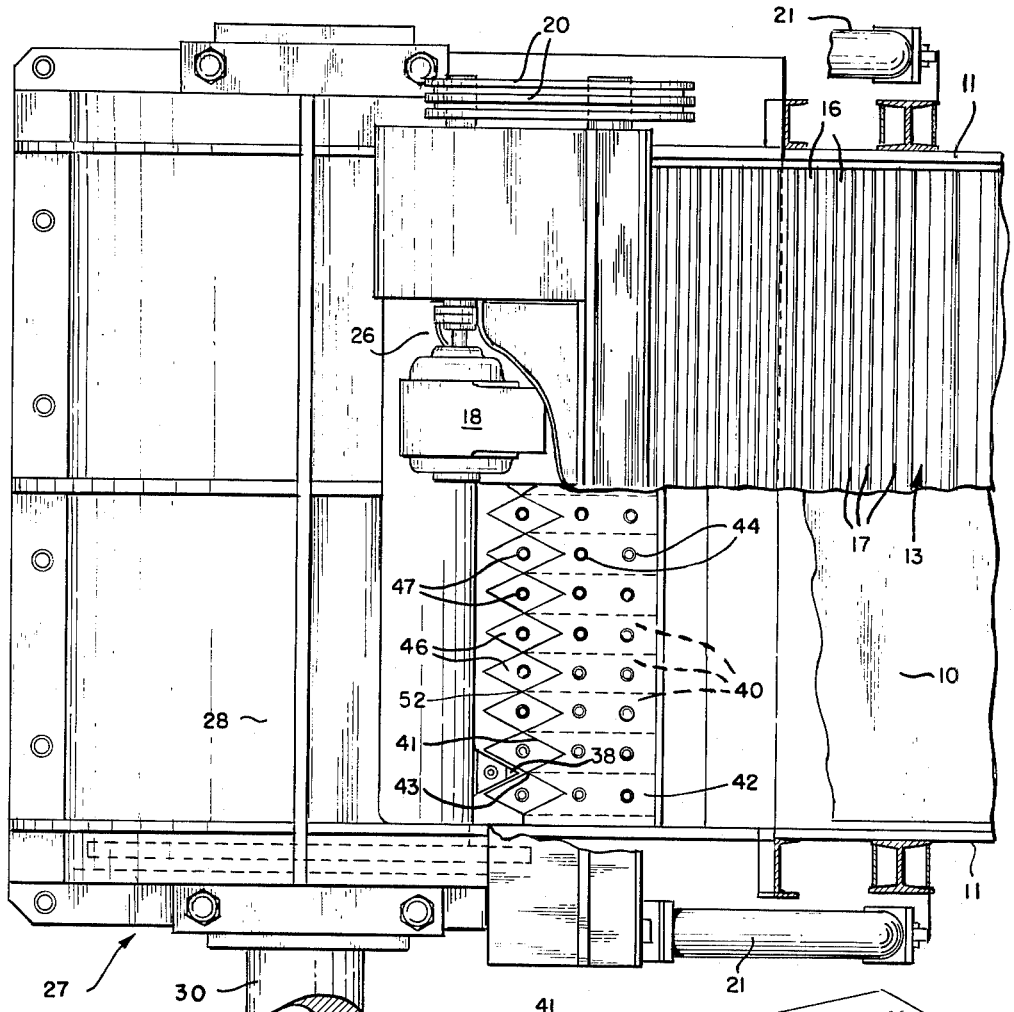
FIG.7
FIG.8
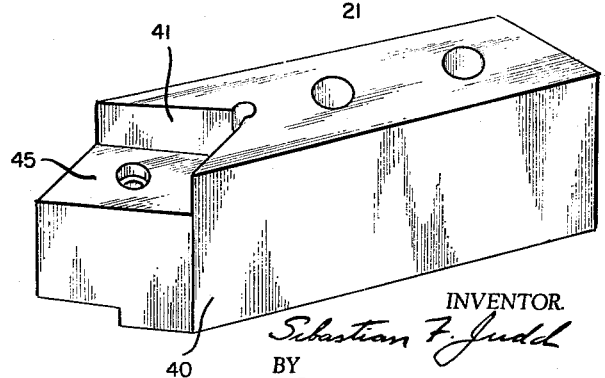
INVENTOR.
Sebastian F. Judd
BY
Morsell & Morsell
Attorneys

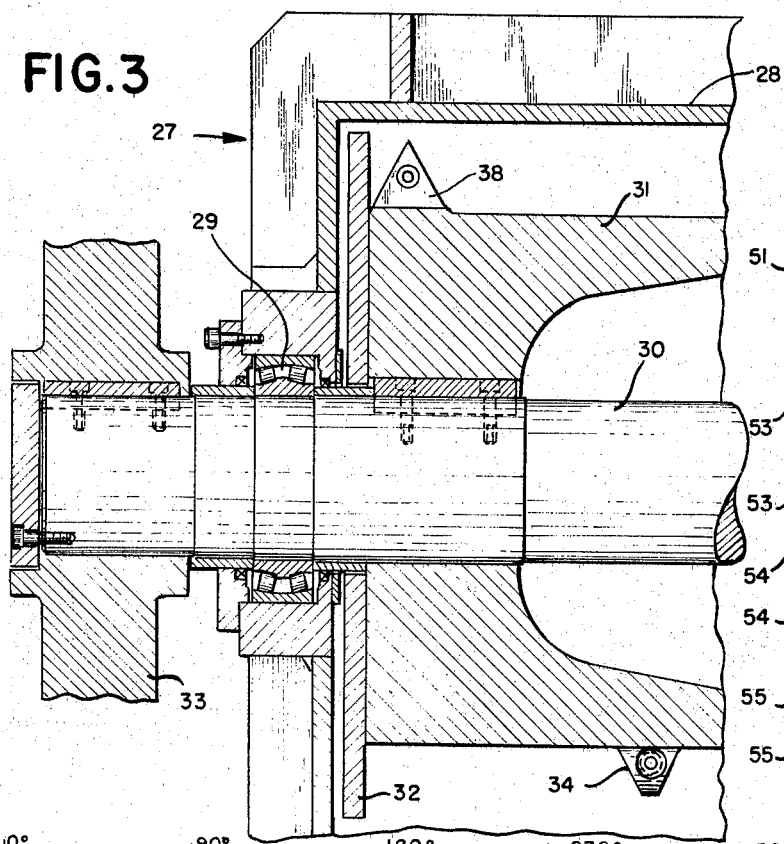
FIG. 3
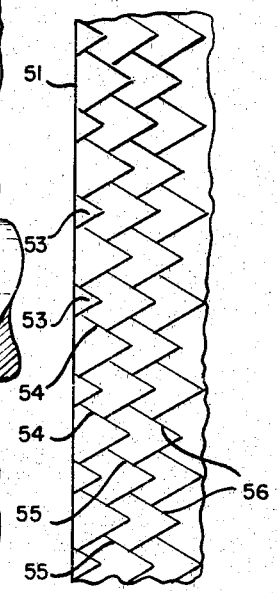
FIG. 5
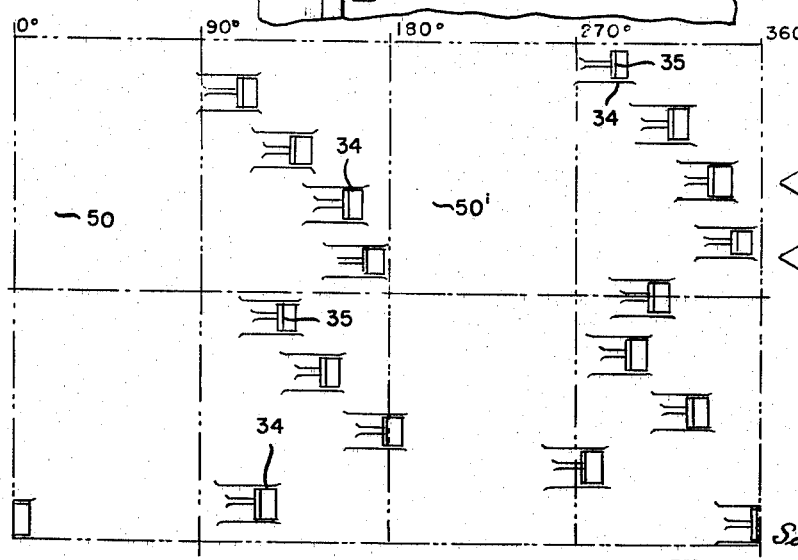
FIG. 4
FIG. 6
INVENTOR.
Sebastian F. Judd
BY
Morsell & Morsell
Attorneys United States Patent Office 3,202,369
Patented Aug. 24, 1965

3,202,369
ROTARY SHEET METAL TEARING DEVICES
Sebastian F. Judd, Milwaukee, Wis., assignor to Steel Briquette Corp., Wauwatosa, Wis., a corporation of Wisconsin
Filed Jan. 16, 1963, Ser. No. 251,884
12 Claims. (Cl. 241—190)

This invention relates to Improvements in Rotary Sheet Metal Tearing Devices.

Heretofore the largest source of scrap metal has been baled automobile bodies, in which there is necessarily a large amount of contaminants such as wood, aluminum, and other materials besides steel. Attempts to burn automobile bodies prior to baling has only partially reduced the percentage of contaminants. As a result, scrap metal from automobile bodies is presently rated only as No. 2 scrap material, and is in increasingly less favor with the steel mills because of certain conditions which make it highly desirable to use higher grade scrap.

Heretofore it has been proposed to shear certain forms of scrap materials into strips by means of a slowly rotating shear. However, these prior shears have only been capable of shearing off strips of the entire width of the rotor. Thus, these prior methods have not been suitable for use in conjunction with cumbersome items such as automobile bodies. It has, however, heretofore been attempted to prepare scrap metal from automobile bodies by subjecting them to the action of a very large hammermill. A hammermill of sufficient size, however, is extremely expensive, so that wide usage of this method has not resulted.

It is a general object of the present invention to provide a relatively compact and relatively inexpensive apparatus for tearing up automobile bodies, which apparatus includes novel structure whereby an automobile body may be successfully torn into small pieces, so that the torn pieces can be readily subjected to magnetic separation. Thus steel which is completely free of contaminants and which may be sold as No. 1 scrap material is obtained, the remaining scrap being in such form that other metal parts of value can be readily salvaged to increase the profit for the scrap dealer.

A further object of the invention is to provide improved apparatus which is so constructed that the tearing can be accomplished with the expenditure of a minimum of power.

A more specific object of the invention is to provide improved apparatus for tearing up large pieces of metal by rotary action wherein a novel form of rotary shredder is utilized having specially shaped triangular knives so disposed that the work is initially engaged by the points of the knives to tear out small pieces of metal in the manner of a beer can opener whereby a minimum of power in required.

A more specific object of the invention is to provide apparatus as above described including a fixed knife having a cutting edge of novel shape for coaction with triangular knives carried by a rotating drum, the knives being so arranged on the drum that shredding takes place across the entire width of the drum during each 360° of rotation.

A further object of the invention is to provide improved sheet metal tearing apparatus having a rotary drum with knives thereon, wherein the knives are so disposed on the drum that clearance by centrifugal force can take place during rotation.

A further object of the invention is to provide apparatus as above described wherein the knife elements on the rotating drum are so formed and shaped as to be readily reversible as to sides and interchangeable in position, thus giving six interchangeable positions.

A still further object of the invention is to provide apparatus as above described including novel means for feeding scrap material to the shredder wherein said feeding means includes mechanism for flattening the body to reduce its thickness prior to feeding the body to the tearing mechanism.

With the above and other objects in view, the invention consists of the improved apparatus for tearing sheet metal into small pieces, and all of its parts and combinations, as set forth in the claims, and all equivalents thereof.

In the accompanying drawings, in which the same reference numerals designate the same parts in all of the views:

FIG. 2 is a top view of the mechanism shown in FIG. 1, part of the front of the crusher-feeder being broken away to show the knives therebelow;

FIG. 3 is a fragmentary vertical longitudinal sectional view through the rotor at one end thereof;

FIG. 4 is a developed pattern of the periphery of the drum to show the knife arrangement;

FIG. 5 is a diagrammatic view showing the cutting pattern which takes place on the scrap metal;

FIG. 6 is an enlarged view of one of the torn pieces of scrap metal;

FIG. 7 is a fragmentary view showing a mounted knife element principally in side elevation, parts being broken away and shown in section;

FIG. 8 is a perspective view of one of the stationary knife holders alone; and

Figure 9:
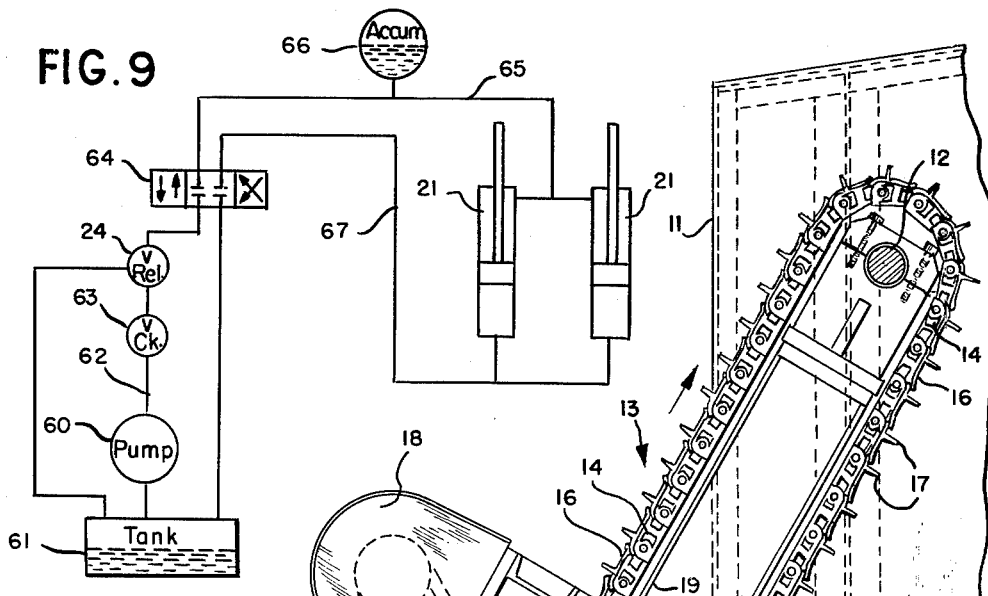
FIG. 9 is a diagrammatic view of the hydraulic circuit for the feeder-crusher rams.

Referring more particularly to the drawings, the numeral 10 designates a slide which is supported between spaced side members 11 of a suitable supporting frame. Pivoted with a pivot shaft 12 which has ends journaled in the side members 11 is a feeder-crusher designated generally by the numeral 13. The feeder-crusher includes endless chain elements 14 suitably trained around upper and lower sprockets, the upper sprockets being rotatably mounted on the shaft 12 and the lower sprockets being keyed to a rotatable shaft 15 which is swingable with the unit 13 toward and away from the slide 10 as the unit pivots with the upper shaft 12. The chains 14 support transverse flights 16 having projections 17 thereon. The flights extend the entire width of the slide for engagement with an automobile body or other metal object to be scrapped as the latter descends by gravity down the slide 10 into engagement with the flights on the underside of the feeder-crusher. The endless chains are driven by an electric motor 18 suitably supported on the frame 19 of the feeder-crusher, there being endless chains 20 for transmitting rotation from the motor 18 to a sprocket wheel on the lower shaft 15. The arrangement is such that during pivotal movement of the feeder-crusher 13 with its pivot shaft 12 the driving motor 18 is movable with the frame 19 for the feeder-crusher unit 13.

Hydraulic rams 21 are pivoted at their lower ends as at 22 to the frame members 11 and have their extensible upper ends pivoted to the feeder-crusher unit as at 23. There is a suitable hydraulic circuit for the rams as shown in FIG. 9, including a relief valve 24 which allows the feeder-crusher to swing upwardly somewhat as the automobile body passes downwardly between the feeder and the slide 10. The mechanism includes a variable-volume pump 60 which pumps hydraulic fluid from a tank 61 through a line 62, past check valve 63 and relief valve 24. The line then passes through a four-way valve 64 and from the latter there is a line 65 leading to the upper ends of the hydraulic cylinders 21, there being an accumulator 66 in communication with the line 65. A predetermined amount of air pressure is put into the upper part of the accumulator. When it is desired to lift the crusher-feeder from the position of FIG. 1 for maintenance or for other reason, the hydraulic valve 64 is reversed to cause the flow from the pump to pass through a line 67 communicating with the lower ends of the hydraulic cylinders 21. The relief valve 63 may either be separate, as illustrated, or may be built into the variable-volume pump 60. It is possible, however, to provide relief without a separate relief valve by means of the action of the accumulator 66. In actual practice the hydraulic pressure acting in a downward direction is such that the automobile body will be flattened, while passing beneath the lower end of the feeder-crusher 13, to somewhere between six and twelve inches in thickness. If the pressure builds up too high, even with the accumulator, the excess pressure will be relieved back to the tank through the relief valve 24. The rate of feed of the endless chains 14 carrying the flights 16 is relatively slow and preferably about twelve feet per minute.

The lower end of the slide 10 is flush with the top of the fixed knife unit 25, which fixed knife unit is positioned at the lower margin of an entrance opening 26 of the shedding unit 27.

The shredding apparatus

The rotary shredder includes a suitable housing 28 having the entrance opening 26 extending throughout its width and at the front upper portion thereof. Suitably journaled through the housing in bearings 29 is a shaft 30. Keyed to the shaft is a rotor 31. It is preferably formed of two castings, each half the length of the rotor, welded together on a circumferential line midway of the length of the rotor. Welded to the ends of the rotor sections for rotation therewith are end discs 32. One end of the drum has a driving gear 33 keyed thereto which is adapted to be driven from an outside source, preferably in the neighborhood of 30 r.p.m.

Suitably cast onto the periphery of the rotor sections 31, or otherwise secured thereto, are knife supports 34 having supporting faces 35. (See FIG. 7.) Each knife support is formed with a bolt hole 36 for receiving a bolt 37, by means of which a knife element 38 may be detachably secured to each knife support, both ends of the bolt being countersunk. Each knife element is an equilateral triangle in outline whereby any one of the three sides may be used as a base when it is secured in position on the holder. Each knife element has substantial thickness and either side may be turned outwardly. Thus, the knife elements on the rotor may be interchanged in position by bringing a new point into operative position or by reversing a side so that there is a total of six interchangeable positions. Thus when wear occurs, it is merely necessary to remove the bolt and bring a new point into outwardly projecting position on the rotor.

In bolting the knife elements 38 to the holders 34, the bolts 37 pass through collars 39, as is clear from FIG. 7. Part of each collar projects into the holder and part into the knife element so that all shearing strains are taken by the collars rather than by the bolts, the latter merely serving to detachably hold the parts in assembled relationship.

FIG. 4 illustrates a 360-degree development of the rotor periphery to show the preferred position of the knife holders. From this view it will be clear that approximately the first 90 degrees of the periphery of the rotor is free of knife elements as at 50, the next approximately 90 degrees has approximately half of the knife elements thereon, the next approximately 90 degrees of the rotor is again free of knife elements as at 50', and the last approximately 90 degrees has the other half of the knife elements arranged in staggered position with respect to the previous group. While the knives can be arranged on the sections in a variety of ways, it is desirable to have them so arranged that only one tooth cuts at a time. In this way a minimum of power is required. It is also important that the individual knife elements be so staggered longitudinally that each part of the entire width of the automobile body is contacted by a knife element once during each 360 degrees of rotation. Thus, when the rotor completes a revolution, the entire projecting edge of the work will be cut off into relatively small pieces, such as those shown in FIG. 6.

The stationary knife unit

Each stationary knife unit 25 preferably includes a series of rectangular knife holders 40 (see FIG. 8) arranged side-by-side, each holder having a top V-shaped outer end recess 41. The holders are covered by a continuous top liner plate 42 having points 43 which coincide with the points between adjacent knife holders 40. The parts are held in position by bolts 44 which extend through the liner plate and through the holders. Each holder has a diamond-shaped supporting shelf 45 (as is clear from FIG. 8) for supporting a diamond-shaped stationary knife element 46, the knife elements being held in position by bolts 47. The fixed knife elements 46 have reversible sides, and also may be reversed end-for-end so that there are four interchangeable cutting positions.

Operation

In use, automobile bodies (or other sheet metal) are suitably fed by a conveyor toward the shredder. In the illustrated embodiment, a gravity slide 10 is employed but other conveyors may be used. As illustrated, the bodies slide by gravity down the slide 10 one after another. The leading body contacts the underside of the crusher-feeder 13. Due to the pivotal mounting of the latter with the shaft 12, it can pivot upwardly somewhat as the conveyor flights 17 tend to positively feed the forwardmost body toward the shredder. At the same time, the flight bars 17 prevent the work from being pulled in too fast by the pull of the rotary knives. The relief valve 24 of the hydraulic system for the hydraulic rams 21 (or the accumulator pressure) is set to allow some outward swinging movement of the lower end of the crusher-feeder unit 13 to take place as is required. However, the hydraulic pressure acting in a downward direction is such, together with the weight of the unit 13, that a predetermined amount of flattening of the body takes place. The relief valve 24 is usually set to allow a crushing or flattening of the body to a thickness of between 6 and 12 inches so that it will fit into the opening 26 of the shredder unit.

Figure 1:
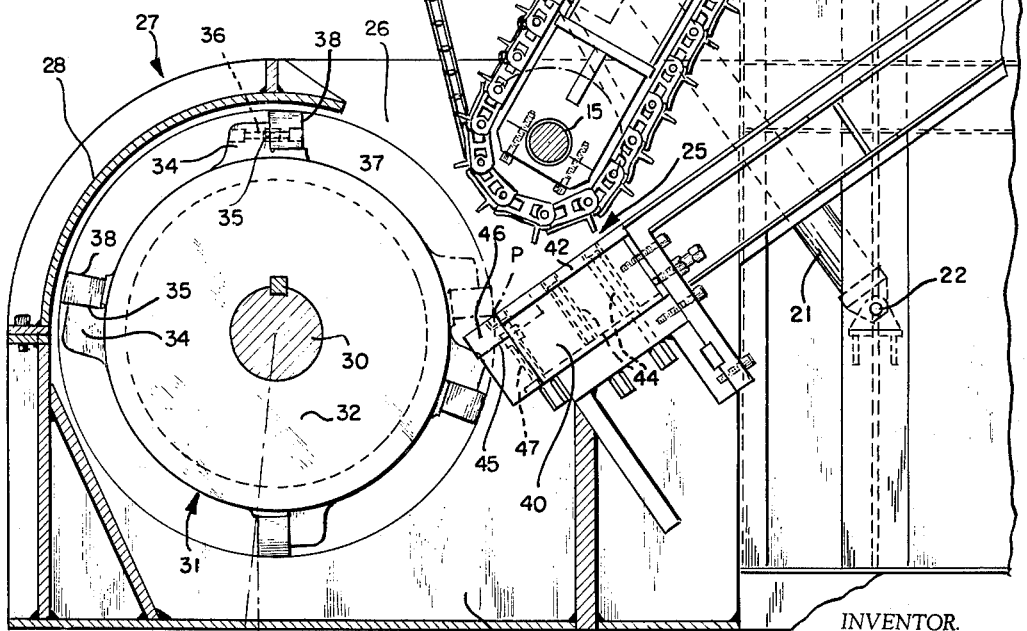
FIG. 1 is an elevational view of the improved apparatus, part of the slide being broken away and other parts being shown in longitudinal vertical section.

As the endless feeder moves the flattened body toward the rotor 31 it will eventually enter a clear area 50 or 50' of the periphery where there are no cutting teeth. Thus the end of the body may be fed into such position that it will thereafter be ready to have its leading edge 51 (see FIG. 5) sheared by the teeth which will thereafter progressively engage said edge. As before mentioned, the holders 34 of FIG. 4 are so staggered and arranged that each part of the width of the rotor presents a cutting tooth to the work at some time during each single revolution. The exact arrangement of the teeth shown in FIG. 4 does not have to be followed. The arrangement shown in FIG. 4, however, is very practical for machining the holders 34. In addition, the arrangement of the teeth on the rotor should be such that one tooth is fully through the work before the work is engaged by another tooth. Thus unnecessary load on the machine is avoided and much less power is required. The progressive engagement of the teeth with the work may be accomplished by a staggered arrangement such as is shown in FIG. 4, or by having the teeth arranged in a spiral or progressive incline on the sections. The drum of the rotor is hollow as shown in FIG. 3 and has considerable weight. Therefore, it will act as flywheel during such rotation. As shown in FIG. 1, the front faces of the rotor knives 38 are so set with respect to the radial line R as to provide a negative rake angle ($a$). In this way clearance by centrifugal force can take place.

The top surface of the stationary knives 46 are so positioned with respect to the rotor that when a rotor knife 38 arrives at shearing position, as shown by the dot-and-dash line position in FIG. 1, its point P engages the apex of the V-shaped space 52 between knives before the sides of the knives start to work. As rotation continues, the points cuts through the metal, and the sides of the cutting teeth progressively follow and shear through. The action is the same as the action of a pointed V-shaped beer can opener. By having this type of action, cutting is accomplished with a minimum of power.

As an edge such as the edge 51 of FIG. 5 of the work is engaged by the knives, the first 90° toothed section of the rotor produces the relatively small cuts 53 of FIG. 5. Then there is a vacant feed section 50 or 50' during which time the leading edge of the work moves in a predetermined additional amount. Then the next 90° cutting section produces the larger triangular cuts 54. Thereafter, each toothed section of the drum produces cuts of the same size, first the row of V-shaped cuts 55, and then the next row of V-shaped cuts 56. Thus most of the scrap pieces are shaped as shown in FIG. 6. These pieces fall into the pit 57 and are usually conveyed by an endless conveyor to a suitable location for separation.

Due to the relatively small size of the cut pieces, as shown in FIG. 6, it is obvious that the iron pieces can be easily removed by magnetic separation to be more readily available for further processing into No. 1 scrap metal. Also, due to the small size of the cut pieces, other parts of value can be readily separated for separate sale instead of being left in the scrap to contaminate the iron. The remaining material, such as wood scraps, cloth, and the like, can be readily burned or otherwise disposed of.

Various changes and modifications may be made without departing from the spirit of the invention, and all of such changes are contemplated as may come within the scope of the following claims.

What I claim is:

1. A device for tearing sheet metal scrap comprising a housing having a receiving opening, a drum-shaped rotor rotatably mounted in said housing, a fixed shearing means having a serrated cutting edge supported adjacent the periphery of the rotor and extending substantially the length thereof and having a series of projecting points defining V-notches between points, and a plurality of shear knives which are V-shaped in plan view and which have points projecting from the periphery of said rotor each shaped to cooperate with one of the V-notches in shearing out a piece of metal from the leading edge of scrap fed into said receiving opening, said fixed shearing means being angled downwardly and forwardly toward the rotor and the shear knives of the rotor being so positioned with respect to the angle of the fixed shearing means as to provide for coaction of the points of the rotor knives with the apexes of the V-notches before the angled sides of the rotor knives arrive at shearing position whereby shearing takes place with a minimum of power, said knives on the drum being so staggered circumferentially and axially as to provide for sequential engagement with the scrap metal until pieces have been sheared throughout the width of the scrap.

2. A device for tearing sheet metal scrap comprising a housing having a receiving opening, a drum-shaped rotor rotatably mounted in said housing, a fixed shearing means having a serrated edge supported adjacent the periphery of the rotor and extending substantially the length thereof and comprising a series of juxtaposed two-sided, detachable diamond-shaped knives forming a series of V-notches, and a plurality of shear knives which are V-shaped in plan view and which have projecting points projecting from the periphery of said rotor each shaped to cooperate with one of the V-notches in shearing out a piece of metal from the leading edge of scrap fed into said receiving opening, said knives on the drum being so staggered circumferentially and axially as to provide for sequential engagement with the scrap metal until pieces have been sheared throughout the width of the scrap, said diamond-shaped knives of the fixed shearing means being reversible and interchangeable in position when wear occurs.

3. A device for tearing sheet metal scrap comprising a housing having a receiving opening, a drum-shaped rotor rotatably mounted in said housing, a fixed shearing means having a serrated edge supported adjacent the periphery of the rotor and extending substantially the length thereof and having a series of juxtaposed V-notches, and a plurality of equilateral triangular, two-sided shear knives detachably supported on the periphery of said rotor, each having three cutting edges on each side and having a projecting point and being shaped to cooperate with one of the V-notches in shearing out a piece of metal from the leading edge of scrap fed into said receiving opening, said knives on the drum being so staggered circumferentially and axially as to provide for sequential engagement with the scrap metal until pieces have been sheared throughout the width of the scrap, the detachable support for the rotor knives providing for reversal of sides and interchangeability of position of the edges of said triangular knives when wear occurs.

4. A device for shearing sheet metal scrap comprising a housing having a receiving opening, a drum-shaped rotor rotatably mounted in said housing, fixed shearing means having V-shaped recesses supported adjacent the periphery of said rotor and extending substantially the length thereof, a plurality of shear knives projecting from the periphery of said rotor, each having a pointed portion which is V-shaped in plan view and which has angled sides to cooperate with a V-shaped recess of said fixed shearing means in shearing out a piece of metal from the leading edge of scrap fed into said receiving opening, said fixed shearing means being angled downwardly and forwardly toward the rotor and said knives on the rotor being so positioned with respect to the angle of the fixed shearing means as to provide for coaction of the points of the rotor knives with the apexes of the V-shaped recesses before the angled sides of the rotor knives arrive at shearing position whereby shearing takes place with a minimum of power, the size and shape of a knife being such with respect to the size and shape of a recess that shearing is performed by coaction of both sides of each knife with the sides of a recess after the point has made engagement.

5. A device for shearing sheet metal scrap comprising a housing having a receiving opening, a drum-shaped rotor rotatably mounted in said housing, fixed shearing means supported adjacent the periphery of said rotor and extending substantially the length thereof, said shearing means comprising a row of shearing knives having projecting portions and cutting edges defining spaces between said projecting portions, and a plurality of shear knives which are projecting from the periphery of said rotor, each shaped to enter a space of the fixed shearing means to cooperate in shearing action with the cutting edges in shearing out a piece of metal from the leading edge of scrap fed into said receiving opening, said knives on the rotor being on two opposed circumferential portions of the rotor and the knives being so staggered circumferentially and axially as to provide for sequential engagement of the knives on one of said opposed portions with part of said spaces of the fixed shearing means and for sequential engagement of the knives of the other of said opposed rotor portions in the remaining spaces so that pieces are sheared throughout the width of the leading edges of scrap during each revolution of the rotor, said rotor periphery having two opposed circumferential portions which are free of knives throughout the length of the rotor to allow for feeding of the scrap between shearings.

6. A device for shearing sheet metal scrap comprising a housing having a receiving opening, a drum-shaped rotor rotatably mounted in said housing, fixed shearing means supported adjacent the periphery of said rotor and extending substantially the length thereof, said shearing means comprising a row of knives having projecting portions which are V-shaped in plan view and which have projecting points and inclined cutting edges defining V-shaped spaces between said points, and a plurality of shear knives which are V-shaped in plan view projecting from the periphery of said rotor with their points forwardmost, each shaped to enter a V-shaped space to cooperate in shearing action with the inclined cutting edges in shearing out a piece of metal from the leading edge of scrap fed into said receiving opening, said knives on the rotor being on two opposed circumferential portions of the rotor and the knives being so staggered circumferentially and axially as to provide for sequential shearing engagement of the knives on one of said opposed portions with part of said V-shaped spaces of the fixed shearing means and for sequential shearing engagement of the knives of the other of said opposed rotor portions in the remaining V-shaped spaces so that pieces are sheared throughout the width of the leading edge of scrap during each revolution of the rotor, said rotor periphery having two opposed circumferential portions which are free of knives throughout the length of the rotor to allow for feeding of the scrap between shearings.

7. A device for shearing sheet metal scrap comprising a housing having a receiving opening, a drum-shaped rotor rotatably mounted in said housing, fixed shearing means supported adjacent the periphery of said rotor and extending substantially the length thereof, said shearing means comprising a row of knives having projecting portions of like size which are V-shaped in plan view and which have projecting points and inclined cutting edges defining V-shaped spaces between said points, and a plurality of shear knives of like size to one another which are V-shaped in plan view projecting from the periphery of said rotor with their points forwardmost, each shaped to enter a V-shaped space to cooperate in shearing action with the inclined cutting edges in shearing out a piece of metal from the leading edge of scrap fed into said receiving opening, said knives on the rotor being on two opposed circumferential portions of the rotor and the knives being so staggered circumferentially and axially as to provide for sequential shearing engagement of the knives on one of said opposed portions with part of said V-shaped spaces of the fixed shearing means and for sequential shearing engagement of the knives of the other of said opposed rotor portions in the remaining V-shaped spaces so that pieces are sheared throughout the width of the leading edge of scrap during each revolution of the rotor, said rotor periphery having two opposed circumferential portions which are free of knives throughout the length of the rotor to allow for feeding of the scrap between shearings.

8. A device for shearing sheet metal scrap comprising a housing having a receiving opening, a drum-shaped rotor rotatably mounted in said housing, fixed shearing means supported adjacent the periphery of said rotor and extending substantially the length thereof, said shearing means comprising a row of knives having projecting portions which are V-shaped in plan view and which have projecting points and inclined cutting edges defining V-shaped spaces between said points, and a plurality of shear knives which are V-shaped in plan view projecting from the periphery of said rotor with their points forwardmost, each shaped to enter a V-shaped space to cooperate in shearing action with the inclined cutting edges in shearing out a piece of metal from the leading edge of scrap fed into said receiving opening, said knives on the rotor being on two opposed circumferential portions of the rotor and the knives being so staggered circumferentially and axially as to provide for sequential shearing engagement of the knives on one of said opposed portions with every other one of said V-shaped spaces of the fixed shearing means and for sequential shearing engagement of the knives of the other of said opposed rotor portions in the remaining V-shaped spaces so that pieces are sheared throughout the width of the leading edge of scrap during each revolution of the rotor, said rotor periphery having two opposed circumferential portions which are free of knives throughout the length of the rotor to allow for feeding of the scrap between shearings.

9. A device for tearing sheet metal scrap comprising a housing having a receiving opening, a drum-shaped rotor rotatably mounted in said housing, a fixed shearing means having a serrated edge supported adjacent the periphery of the rotor and extending substantially the length thereof and comprising a series of juxtaposed two-sided, detachable diamond-shaped knives forming a series of V-notches, and a plurality of shear knives which are V-shaped in plan view and which have projecting points projecting from the periphery of said rotor each shaped to cooperate in shearing action with one of the V-notches in shearing out a piece of metal from the leading edge of scrap fed into said receiving opening, said knives on the drum being in two opposed groups with one group positioned to enter alternate notches and with the other group positioned to enter the remaining notches, there being opposed spaces on the drum which are free of knives to provide a space into which scrap may be advanced before being additionally cut, the size of the knives on the rotor being such that the V-cuts on the scrap provided by the first group of knives is partially overlapped by the cuts provided by the second group of knives.

10. A device for shearing sheet metal scrap comprising a housing having a receiving opening, a drum-shaped rotor rotatably mounted in said housing, fixed shearing means having V-shaped recesses supported adjacent the periphery of said rotor and extending substantially the length thereof, a plurality of shear knives projecting from the periphery of said rotor each having sides converging to a leading edge which defines a point and each knife being shaped to cooperate with a V-shaped recess of said fixed shearing means in shearing out a piece of metal from the leading edge of scrap fed into said receiving opening, said knives on the rotor being so angled that said leading edges of the knives which define the points are inclined backwards from radii of the rotor so that centrifugal force will readily clear scrap therefrom.

11. A device for shearing sheet metal scrap comprising a housing having a receiving opening, a drum-shaped rotor rotatably mounted in said housing, fixed shearing means having V-shaped recesses supported adjacent the periphery of said rotor and extending substantially the length thereof, a plurality of shear knives projecting from the periphery of said rotor each having sides converging to a leading edge which defines a point and each knife being shaped to cooperate with a V-shaped recess of said fixed shearing means in shearing out a piece of metal from the leading edge of scrap fed into said receiving opening, said knives on the rotor being so angled that said leading edges of the knives which define the points are inclined backwards from radii of the rotor so that centrifugal force will readily clear scrap therefrom, and said fixed shearing means being so angled with respect to the rotor knives as to provide for entrance of the points of the rotor knives into the apexes of the V-shaped recesses before the angled sides of the rotor knives arrive at shearing position whereby shearing takes place with a minimum of power.

12. A device for tearing sheet metal scrap comprising a housing having a receiving opening, a drum-shaped rotor rotatably mounted in said housing, a fixed shearing means having a serrated edge supported adjacent the periphery of the rotor and extending substantially the length thereof and comprising a series of juxtaposed V-notches, and a plurality of shear knives which are V-shaped in plan view and which have projecting points projecting from the periphery of said rotor each shaped to cooperate in shearing action with one of the V-notches in shearing out a piece of metal from the leading edge of scrap fed into said receiving opening, the size and arrangement of the knives on the rotor being such that the V-cuts on the scrap provided by certain knives is partially overlapped by the cuts provided by certain other knives.

References Cited by the Examiner
UNITED STATES PATENTS

| | | | |
|---|---|---|---|
| 496,260 | 4/93 | Haugen | 100—95 X |
| 906,670 | 12/08 | Wise et al. | 146—118 |
| 1,153,103 | 9/15 | Neale | 100—151 X |
| 1,365,927 | 1/21 | Waddington et al. | 146—117 X |
| 1,598,364 | 8/26 | Cassell et al. | 100—94 X |
| 1,656,063 | 1/28 | Harrison | 100—94 |
| 2,150,984 | 3/39 | Near et al. | 100—95 X |
| 2,415,355 | 2/47 | Kaufmann et al. | 100—152 |
| 2,479,759 | 8/49 | Merchant | 100—170 X |
| 2,582,154 | 1/52 | Papendick | 146—119 |
| 2,588,741 | 3/52 | Matthiesen | 241—190 |
| 2,655,213 | 10/53 | Anderson | 83—906 |
| 2,765,731 | 10/56 | Edwards | 100—170 X |
| 2,812,815 | 11/57 | Quinsey et al. | 83—906 X |
| 2,870,840 | 1/59 | Kwitek | 83—678 X |

FOREIGN PATENTS

| | | |
|---|---|---|
| 794,326 | 12/35 | France. |
| 380,865 | 9/23 | Germany. |
| 4,747 | 3/84 | Great Britain. |

LESTER M. SWINGLE, *Primary Examiner.*

WALTER A. SCHEEL, *Examiner.*